United States Patent
Agbor et al.

(10) Patent No.: US 9,421,994 B2
(45) Date of Patent: Aug. 23, 2016

(54) STEERING COLUMN FOR A MOTOR VEHICLE

(71) Applicant: THYSSENKRUPP PRESTA AG, Eschen (LI)

(72) Inventors: Thomas Agbor, St. Gallen (CH); Thomas Geiselberger, Rohrschach (CH); Martin Fleischer, Balgach (CH)

(73) Assignee: THYSSENKRUPP PRESTA AG, Eschen (LI)

( * ) Notice: Subject to any disclaimer, the term of this patent is extended or adjusted under 35 U.S.C. 154(b) by 0 days.

(21) Appl. No.: 14/765,171

(22) PCT Filed: Dec. 20, 2013

(86) PCT No.: PCT/EP2013/003877
§ 371 (c)(1),
(2) Date: Jul. 31, 2015

(87) PCT Pub. No.: WO2014/117800
PCT Pub. Date: Aug. 7, 2014

(65) Prior Publication Data
US 2015/0375767 A1    Dec. 31, 2015

(30) Foreign Application Priority Data
Feb. 1, 2013   (DE) .................. 10 2013 101 045

(51) Int. Cl.
*B62D 1/181*   (2006.01)
*B62D 7/22*    (2006.01)
*B62D 1/19*    (2006.01)

(52) U.S. Cl.
CPC ........ *B62D 1/181* (2013.01); *B62D 1/19* (2013.01); *B62D 7/224* (2013.01)

(58) Field of Classification Search
CPC ........... B62D 1/181; B62D 1/19; B62D 7/224
See application file for complete search history.

(56) References Cited

U.S. PATENT DOCUMENTS

| 4,941,679 | A * | 7/1990 | Baumann | ........... B62D 1/181 280/775 |
| 5,690,362 | A * | 11/1997 | Peitsmeier | ........... B62D 1/19 280/775 |
| 2006/0266151 | A1 * | 11/2006 | Avers | ........... B62D 1/181 74/492 |

(Continued)

FOREIGN PATENT DOCUMENTS

| DE | 3636315 A1 | 4/1988 |
| GB | 2304865 A | 3/1997 |
| JP | 2002 002501 A | 1/2002 |

OTHER PUBLICATIONS

German language International Search Report for International patent application No. PCT/EP2013/003877; mailing date Apr. 17, 2014.

(Continued)

*Primary Examiner* — Faye M Fleming
(74) *Attorney, Agent, or Firm* — thyssenkrupp Noth America, Inc.

(57) ABSTRACT

The invention relates to a steering column for a motor vehicle, wherein the steering column comprises a steering spindle bearing unit and a steering spindle mounted in the steering spindle bearing unit so as to be rotatable about a steering spindle longitudinal axis, and a support unit, which is provided in the motor vehicle for fixing the steering column and against which the steering spindle bearing unit is retained. The steering spindle bearing unit has a thread and can be adjusted by means of a motor along the steering spindle longitudinal axis relative to the support unit, wherein the steering spindle bearing unit, for adjustment thereof along the steering spindle longitudinal axis relative to the support unit, is connected by means of at least one drive belt or at least one drive chain to the motor.

8 Claims, 4 Drawing Sheets

(56) References Cited

U.S. PATENT DOCUMENTS

| | | | | |
|---|---|---|---|---|
| 2009/0308189 A1* | 12/2009 | Tomaru | ............... | B62D 1/181 74/89.42 |
| 2011/0247891 A1* | 10/2011 | Meyer | ............... | B60R 13/08 180/443 |
| 2012/0180594 A1* | 7/2012 | Park | ............... | B62D 1/181 74/493 |
| 2013/0098193 A1* | 4/2013 | Morinaga | ............... | B62D 1/181 74/493 |
| 2014/0305252 A1* | 10/2014 | Mizuno | ............... | B62D 1/181 74/493 |
| 2014/0352481 A1* | 12/2014 | Uesaka | ............... | B62D 1/181 74/493 |
| 2015/0028574 A1* | 1/2015 | Meyer | ............... | B62D 7/224 280/775 |
| 2015/0061271 A1* | 3/2015 | Morinaga | ............... | B62D 1/181 280/775 |
| 2015/0232117 A1* | 8/2015 | Stinebring | ............... | B62D 1/195 74/493 |

OTHER PUBLICATIONS

English translation of International Search Report for International patent application No. PCT/EP2013/003877; mailing date Apr. 17, 2014.

English Abstract of DE 3636315 A1.

English Abstract of JP 2002002501 A.

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2013/003877, filed Dec. 20, 2013, which claims priority to German patent application no. DE 102013101045.8 filed Feb. 1, 2013, the entire contents of both of which are incorporated herein by reference.

FIELD

The present invention relates to a steering column for a motor vehicle, wherein the steering column has a steering spindle bearing unit and a steering spindle, which is mounted in the steering spindle bearing unit so as to be rotatable about a steering spindle longitudinal axis, and a supporting unit which is provided for the fastening of the steering column in the motor vehicle and on which the steering spindle bearing unit is held, and the steering spindle bearing unit has a thread and can be adjusted along the steering spindle longitudinal axis relative to the supporting unit by way of a motor.

BACKGROUND

In the case of generic steering columns, the position of the steering wheel can be adjusted in the direction of the steering spindle longitudinal axis by way of a motor in order to adapt the position of the steering wheel, which is mounted on the steering spindle, to the respective vehicle driver.

A generic steering column is presented for example in DE 36 36 315 A1. In said document, the steering spindle bearing unit has a sleeve which is mounted in rotatable fashion on its outer surface. Said sleeve bears the thread and engages into a nut which is fixed to the supporting unit. To set said sleeve in rotation, an electric motor is provided which drives the sleeve by way of a worm in order to rotate said sleeve about the steering spindle longitudinal axis. Rotation of said sleeve in the nut which is arranged fixedly on the supporting unit results in an adjustment of the steering spindle bearing unit together with the steering spindle in the direction of the steering spindle longitudinal axis.

BRIEF DESCRIPTION OF THE DRAWINGS

The present disclosure is described in detail below with reference to the attached drawing figures, wherein.

DETAILED DESCRIPTION

Figure 1:
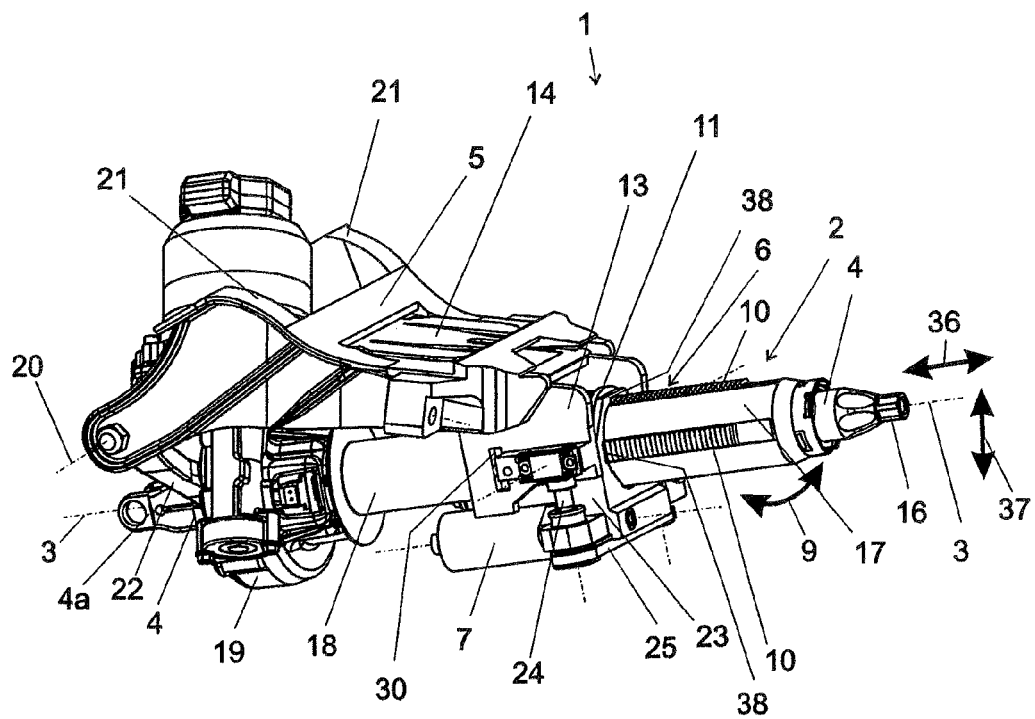
FIGS. 1 and 2 are isometric views of an embodiment of a steering column of the present disclosure.

Utilizing the methods and systems described herein, a steering column is provided having an alternative motor-driven drive unit, which is as quiet as possible but also takes up little installation space, and which is configured to drive the steering spindle bearing unit so as to adjust the position of the steering column along a longitudinal axis of the steering spindle.

Said steering column is distinguished by the fact that the steering spindle bearing unit, for its adjustment along the steering spindle longitudinal axis relative to the supporting unit, is connected by means of at least one drive belt or at least one drive chain to the motor.

It is therefore a basic concept of the invention to transmit the rotational movement of the motor by way of at least one drive belt or at least one drive chain to the steering spindle bearing unit, such that the latter is adjusted in the direction of the steering spindle longitudinal axis relative to the supporting unit when it is correspondingly driven by the motor.

The motor is preferably an electric motor. The steering spindle is preferably of telescopic design. For example, it may have at least two steering spindle sections which engage one inside the other so as to be non-rotatable relative to one another but which are displaceable relative to one another, preferably one inside the other, in the direction of the steering spindle longitudinal axis. That part or section of the steering spindle which bears the steering wheel connection for the fastening of the steering wheel is expediently mounted in the steering spindle bearing unit such that, despite being rotatable about the steering spindle longitudinal axis, it is not displaceable relative to the steering spindle bearing unit in the direction of the steering spindle longitudinal axis. This type of design and mounting of the steering spindle in the steering spindle bearing unit is known per se from the prior art and does not need to be explained in any more detail.

It is expediently provided that the motor has a drive rotor by which it acts on the drive belt or on the drive chain. The steering spindle bearing unit may, like the steering spindle, be of telescopic design. In this context, it is expedient if the steering spindle bearing unit is of multi-part form, wherein the parts of the steering spindle bearing unit are arranged so as to engage one inside the other in telescopic fashion in the direction of the steering spindle longitudinal axis, and that part of the steering spindle bearing unit which is situated closest to a steering wheel connection of the steering spindle has the thread. Said parts of the steering spindle bearing unit may, like the steering spindle bearing unit as a whole, be of tubular form and engage around or encase corresponding sections of the steering spindle.

The thread, which serves for the adjustment of the steering spindle bearing unit in the direction of the steering spindle longitudinal axis is, in preferred embodiments, formed on the outside of the steering spindle bearing unit. It is thus preferably an external thread. It is however alternatively also possible for said thread to be an internal thread which is formed internally in the steering spindle bearing unit. The steering spindle bearing unit is normally of tubular form and encases the one or more sections, mounted rotatably therein, of the steering spindle. By means of the steering spindle, the rotational movement of the steering wheel is transmitted to the steering gear and thus to the wheels of the vehicle that are correspondingly provided for steering purposes. At any rate, the thread is expediently of encircling form around the steering spindle bearing unit in the circumferential direction. It may but need not imperatively be formed over the entire circumferential direction. It is for example also possible for the thread to be formed in the manner of thread sections which are spaced apart from one another in the circumferential direction of the steering spindle bearing unit. Said thread sections are preferably of strip-shaped form. Their longitudinal extent expediently runs parallel to the steering spindle longitudinal axis. To transmit the rotational movement generated at the drive belt and/or the drive chain by the motor to the thread of the steering spindle bearing unit, a nut is preferably provided. The nut can engage into the thread of the steering spindle bearing unit. The nut can be rotatable by means of the drive belt or the drive chain. The thread may be arranged fixedly and non-rotatably on the steering spindle bearing unit. The thread is advantageously formed by multiple, at least three, thread sections, of which preferably one or more thread sections is or are fixed to the casing tube so as to be displaceable in the direction of the longitudinal axis. In this case, at least one individual thread section, preferably exactly one single thread section, are arranged on the casing tube so as to be non-displaceable in the longitudinal direction, whereas the other thread sections are arranged so as to be displaceable in the longitudinal direction. The displacement travel is in this case advantageously limited to the spacing of second thread flights to one another.

To illustrate the invention, a belt tensioning system is advantageously provided, which is in this case not illustrated in the figures.

Since, for the movement of the steering spindle bearing unit in the direction of the steering spindle longitudinal axis, it is however ultimately merely of importance that the nut and steering spindle bearing unit perform a rotation relative to one another, there is also, in a departure from this, the alternative variant in which the nut is fastened rotationally conjointly to the supporting unit or rotationally conjointly in some other way to the motor vehicle. It is then possible, as presented in DE 36 36 315 A1, for the steering spindle bearing unit to have a sleeve which is mounted so as to be rotatable about the steering spindle longitudinal axis and which bears the thread of the steering spindle bearing unit. Said sleeve should then, as is specifically also presented in DE 36 36 315 A1, be non-displaceable in the direction of the steering spindle longitudinal axis relative to the other parts of the steering spindle bearing unit. The drive of said rotatable sleeve of the steering spindle bearing unit may then in turn be realized by the motor via the drive belt and/or the drive chain. In these cases, the thread is thus fixedly and non-rotatably arranged only on the sleeve and not on the other parts of the steering spindle bearing unit. Preferred embodiments of the invention provide, in any case, that the nut has an internal thread and engages by way of said internal thread into the thread of the steering spindle bearing unit. As already discussed in the introduction, it is however also conceivable for the nut to have an external thread, specifically if the steering spindle bearing unit has an internal thread. For a space-saving design, it is at any rate expedient for the steering spindle bearing unit to be led through the nut. To prevent rotation of the steering spindle bearing unit about the steering spindle longitudinal axis, preferred embodiments of the invention provide that the steering spindle bearing unit is mounted in the supporting unit, so as to be non-rotatable relative to the supporting unit, by way of a means for preventing rotation about the steering spindle longitudinal axis. The means for preventing rotation prevents the steering spindle bearing unit being rotated about the steering spindle longitudinal axis relative to the supporting unit.

Steering columns according to the invention may also have energy-absorbing elements or apparatuses for a crash situation, that is to say for an accident situation. Such energy-absorbing elements for a crash situation are basically known in a wide variety of embodiments in the prior art. In this context, preferred embodiments of the invention provide, at any rate, that the steering spindle bearing unit is held on the supporting unit with the interposition of a carriage, wherein the carriage with the steering spindle bearing unit is mounted displaceably on the supporting unit with the interposition of an energy-absorbing element for a crash situation.

Furthermore, it is self-evidently also possible for steering columns according to the invention to have a means for permitting height adjustment of the steering spindle or steering spindle bearing unit relative to the support unit. Said means for height adjustment may be operable purely manually or may be designed to be operable by motor. In this context, particularly preferred embodiments of the invention provide that the steering column according to the invention has a height-adjustment motor which drives corresponding height-adjustment spindles, for example.

The present disclosure will be discussed in further detail below with reference to the attached drawing figures related to an embodiment of the concepts disclosed herein.

Figure 2:
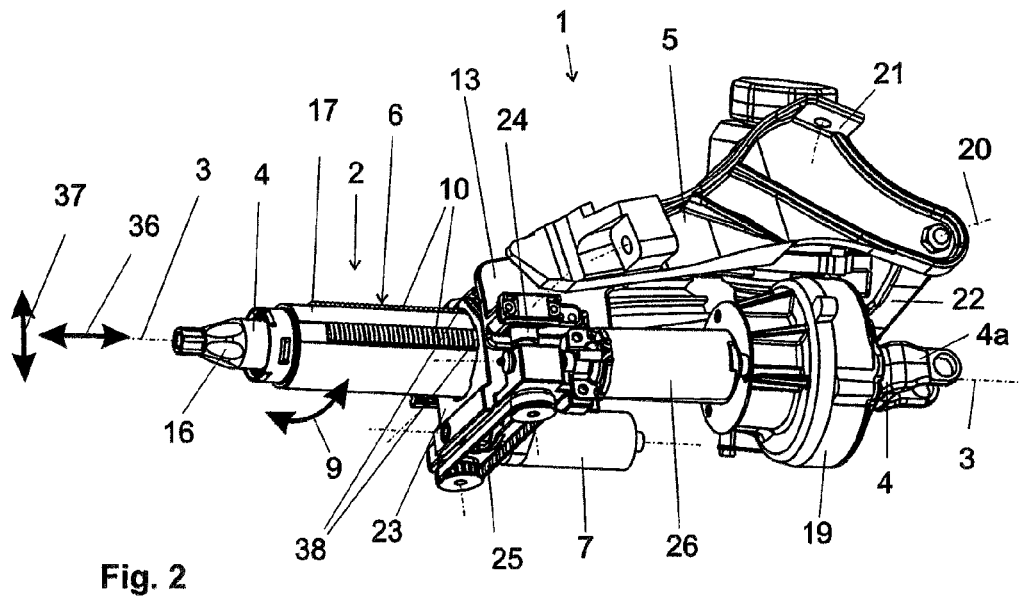
Figure 3:
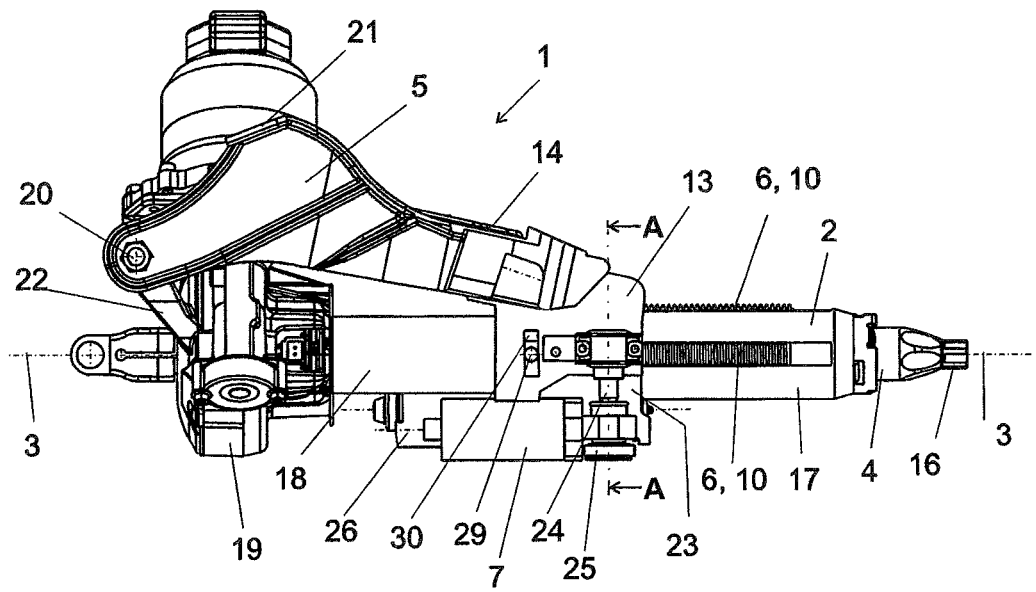
FIG. 3 is a side view of the steering column of FIGS. 1 and 2.

In FIGS. 1 and 2, the exemplary embodiment of a steering column 1 according to the invention shown here is depicted in perspective illustrations obliquely from above and obliquely from below respectively. FIG. 3 shows the steering column 1 in a side view. The exemplary embodiment shown here is a so-called electrically adjustable steering column. Accordingly, the steering spindle bearing unit 2 together with the steering spindle 4 can be adjusted along the steering spindle longitudinal axis 3 in the longitudinal directions 36 by means of the motor 7. The height-adjustment motor 26 serves for height adjustment in the height direction 37. Said motors are each electric motors. It is basically also possible for other motors to be used in order to realize the adjustment possibilities discussed in detail below.

The steering spindle 4 is mounted in the steering spindle bearing unit 2 so as to be rotatable about its steering spindle longitudinal axis 3. In general, the steering spindle 4 is of multi-part form. It normally also comprises joint parts, such as the fork 4a shown in the example, for forming a universal joint (not illustrated in any more detail). The individual sections or parts of the steering spindle 4 are arranged rotationally conjointly with respect to one another but so as to be displaceable, preferably telescopically, with respect to one another in the longitudinal direction. This is known per se in order that the steering spindle 4 can be shortened in the event of a crash. In the section as per FIG. 4, it is possible to see the two parts of the steering spindle 4 which engage one inside the other in rotationally conjoint fashion. The mounting of the steering spindle 4 in the steering spindle bearing unit 2 does not need to be discussed in any more detail. Suitable bearing types are known in the prior art. To enable a steering wheel (not illustrated here) to be fastened to the steering spindle 4, the latter has a steering wheel connection 16. It is also to be pointed out that that part of the steering spindle 4 which has the steering wheel connection 16 is mounted rotatably in the steering wheel-side part 17 of the steering spindle bearing unit 2 such that the stated part of the steering spindle 4 and the part 17 of the steering spindle bearing unit 2 are not displaceable relative to one another in the longitudinal direction 36. In the exemplary embodiment shown, the steering spindle bearing unit 2 is formed from two parts 17 and 18 which are displaceable relative to one another in the longitudinal direction 36, that is to say along the steering spindle longitudinal axis 3, and which in this case likewise engage one inside the other in telescopic fashion. The part 17 points toward the steering wheel connection 16. The part 18 leads to the steering assistance unit 19. The latter may be designed as is known per se from the prior art. In this case, the steering assistance means 19 can both realize a transmission ratio of the steer angle introduced into the steering spindle 4 by way of the steering wheel, as is known under the expression "superposition steering", and also impart torque assistance, such as is known under the expression "servo steering". Such steering assistance means 19 are known in the prior art and do not need to be discussed in any more detail here. The invention can however also be applied to steering columns without steering assistance means. The steering column according to the invention may also be used in steer-by-wire steering systems or in steering systems in which the steering assistance is realized at some other position in the motor vehicle, for example in the steering gear.

The steering spindle 4 may also be rotatably mounted in the part 18 of the steering spindle bearing unit 2. If the steering spindle 4 is mounted in rotatable fashion in some other way, it is however possible for both the bearing arrangement in the part 18 and the part 18 of the steering spindle bearing unit 2 to be omitted entirely.

The supporting unit 5 can be fastened to the body of the motor vehicle by way of the fastening lugs 21. Said supporting unit serves as a support for the steering spindle bearing unit 2. In the exemplary embodiment shown, the steering spindle bearing unit 2 is held on the supporting unit 5 not directly but indirectly with the interposition of the carriage 13 and the intermediate part 23. In a manner known per se, an energy-absorbing element 14 is arranged between the carriage 13 and the supporting unit 5, which energy-absorbing element serves for dissipating impact energy in the event of a crash, that is to say in the event of a vehicle collision. Here, as energy-absorbing element 14, all types of such elements known from the prior art may basically be used. In the exemplary embodiment shown, the energy-absorbing element 14 is formed in the manner of a bending lug. One leg of the bending lug is fixed to the supporting unit 5. The other leg of the bending lug is fixed to the carriage 13. In the event of a crash, the carriage 13 together with the steering spindle bearing unit 2 and the steering spindle 4 is displaced in the direction toward the front wheels of the vehicle, that is to say in the direction toward the fastening lugs 21, wherein the impact energy is dissipated through corresponding deformation, and possibly with an additional associated fracture, of the energy-absorbing element 14.

For height adjustment in height directions 37, the steering spindle bearing unit 2 together with the steering spindle 4 is suspended on the supporting unit 5 so as to be pivotable about the pivot axis 20. In the exemplary embodiment shown, said pivotable suspension is realized by way of the rocker 22 and the steering assistance means 19 and the intermediate part 23, which is suspended separately therefrom on the carriage 13. This is self-evidently merely an example, and may also be implemented in an entirely different way. For the height adjustment itself, the steering spindle bearing unit 2 is fastened to the carriage 13 not directly but with the interposition of the intermediate part 23. The intermediate part 23 together with the steering spindle bearing unit 2, and thus also with the steering spindle 4, can be adjusted relative to the carriage 13 in height directions 37. In order that tilting of the intermediate part 23 in the carriage 13 does not occur during said height adjustment, a slotted guide is provided in this exemplary embodiment. This can be seen particularly clearly in the side view in FIG. 3. Said slotted guide is a slot-shaped guide groove 30 in the carriage 13, in which a guide peg 29 of the intermediate part 23 is guided in displaceable fashion. It is conceivable and possible for a guide of said type to be formed in some other way, or omitted if not required. The height adjustment itself is realized by way of the height-adjustment motor 26, which drives one of the height-adjustment spindles 24 directly and drives the other height-adjustment spindle 24 indirectly via the toothed belt 25. The height-adjustment spindles 24 engage by way of their thread in each case into one of the height-adjustment nuts 27. Said height-adjustment nuts 27 are each fixed to the carriage 13. All of this can be seen most clearly in the section in FIG. 4, along the section line AA in FIG. 3. Rotation of the height-adjustment motor 26 causes both height-adjustment spindles 24 to be rotated. Owing to their meshing engagement into the height-adjustment nuts 27, an upward or downward movement in the height direction 37 occurs depending on the direction of rotation of the height-adjustment spindles 24, whereby the intermediate part 23 together with the steering spindle bearing unit 2 and the steering spindle 4 is raised or lowered in the carriage 13, and thus the desired height adjustment in the height direction 37 is realized. In the exemplary embodiment shown, two height-adjustment spindles 24, one on the right and one on the left of the carriage 13, are used in order to prevent lateral tilting of the intermediate part 23 in the carriage 13. In the implementation of corresponding guides, it is self-evidently also possible to omit one of the height-adjustment spindles 24. Other designs of the height-adjustment arrangement, such as are generally known in the prior art, are conceivable and possible and may be combined with the steering column according to the invention.

To realize the length adjustment according to the invention in the longitudinal directions 36 or along the steering spindle longitudinal axis 3, it is provided that the steering spindle bearing unit 2 has a thread 6 which, in the exemplary embodiment shown, is realized as an external thread arranged on the outside of the steering spindle bearing unit 2. For their adjustment along the steering spindle longitudinal axis 3 relative to the supporting unit, the steering spindle bearing unit 2 and thus also the steering spindle 4 are connected by way of a drive belt 8 to the motor 7. In the exemplary embodiment shown, the thread 6 is realized in the form of thread sections 10 which are of strip-shaped form and which are spaced apart from one another in the circumferential direction 9 of the steering spindle bearing unit 2. The strip-shaped thread sections 10 are guided through leadthroughs 38 in the intermediate part 23. The interaction of the thread sections 10 and leadthroughs 38 can additionally also act as a rotation prevention means, which prevents the steering spindle bearing unit 2 or its part 17 which bears the thread 6 from rotating about the steering spindle longitudinal axis 3 relative to the intermediate part 23. It is also possible for any other type of rotation prevention means to be realized, for example a peg-type guide arrangement or tongue-and-groove guide arrangement between steering spindle bearing unit 2, or the part 17 thereof, and the intermediate part 23.

Figure 4:
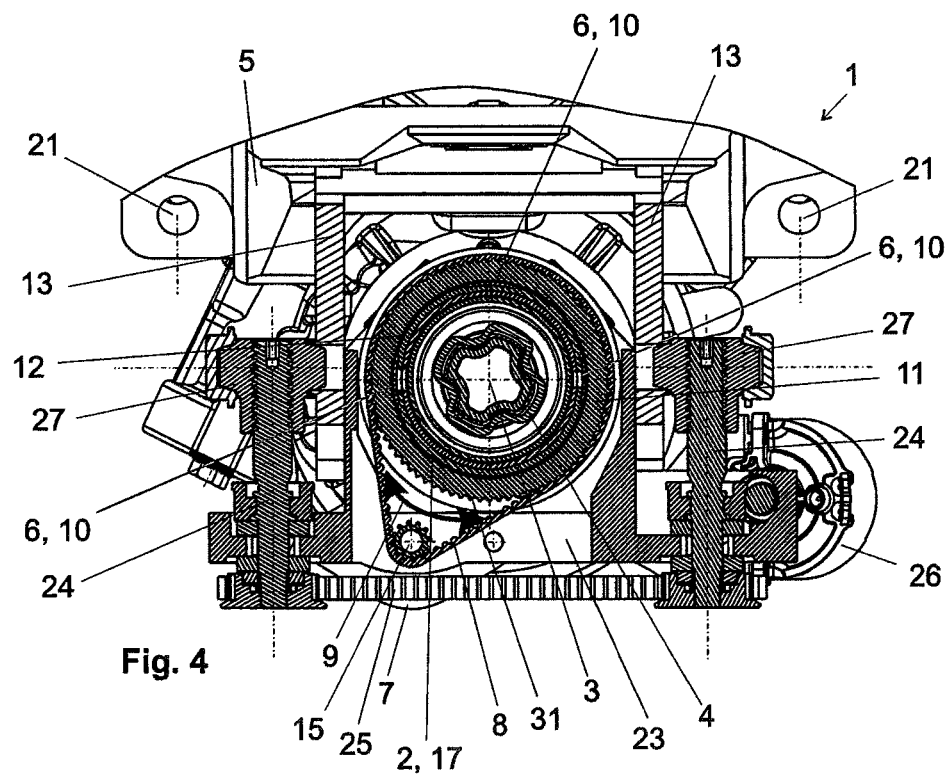
FIG. 4 is a section view of the steering column of FIG. 1, taken about the section line AA in FIG. 3.

For further discussion of the longitudinal adjustment according to the invention along the steering spindle longitudinal axis 3 or the longitudinal direction 36, reference will now be made to FIGS. 4 to 8 in particular. FIG. 4 shows the section along the section line AA from FIG. 3.

Figure 5:
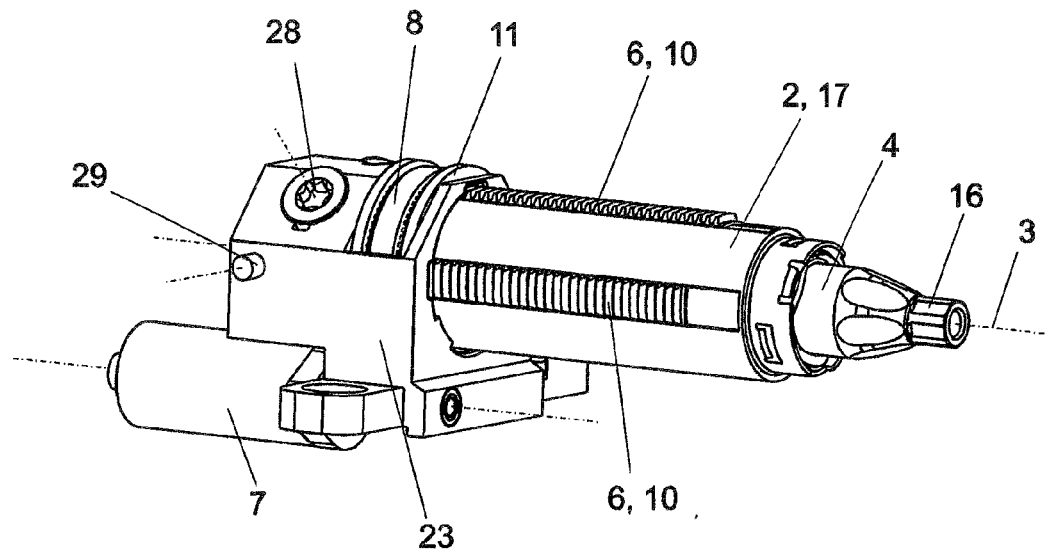
FIGS. 5 through 8 are isometric views of components and sub-assemblies of the steering column of FIG. 1.
Figure 6:
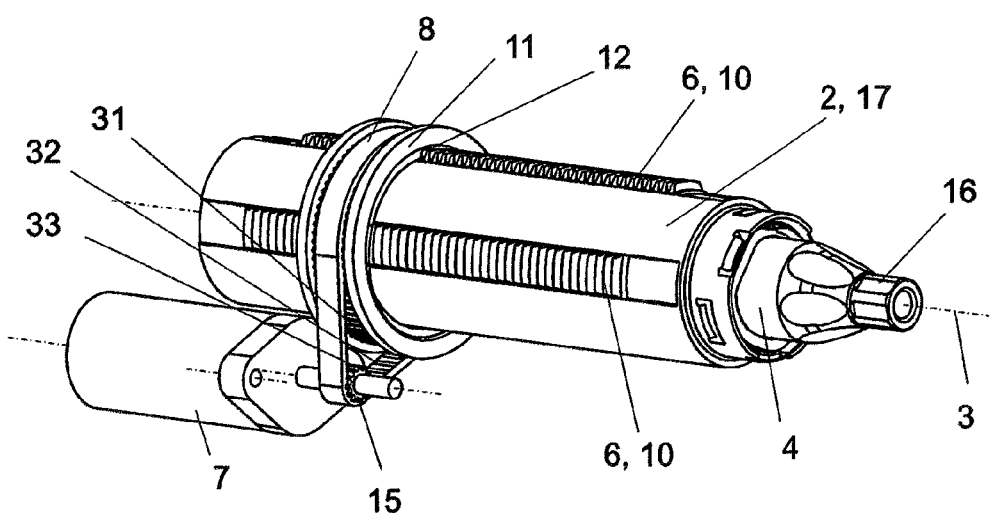
Figure 7:
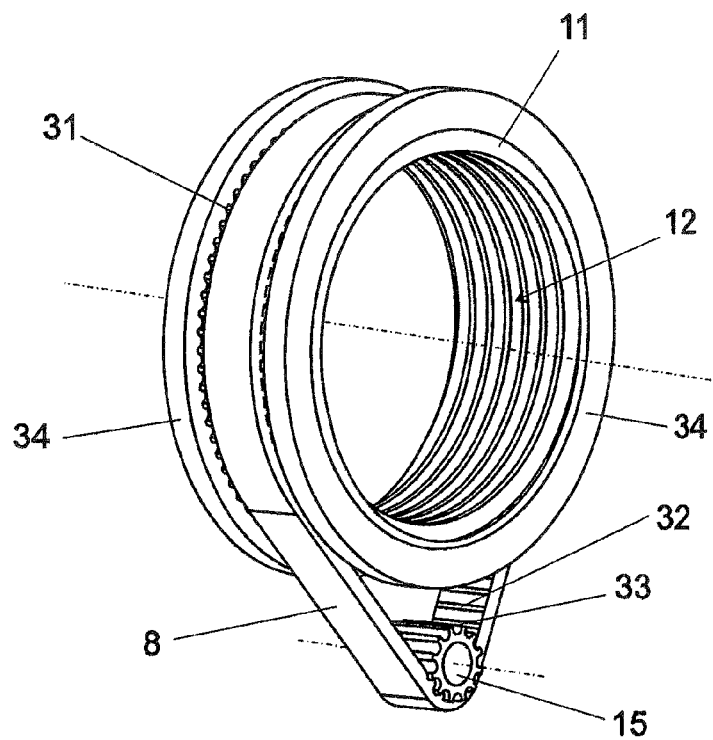
Figure 8:
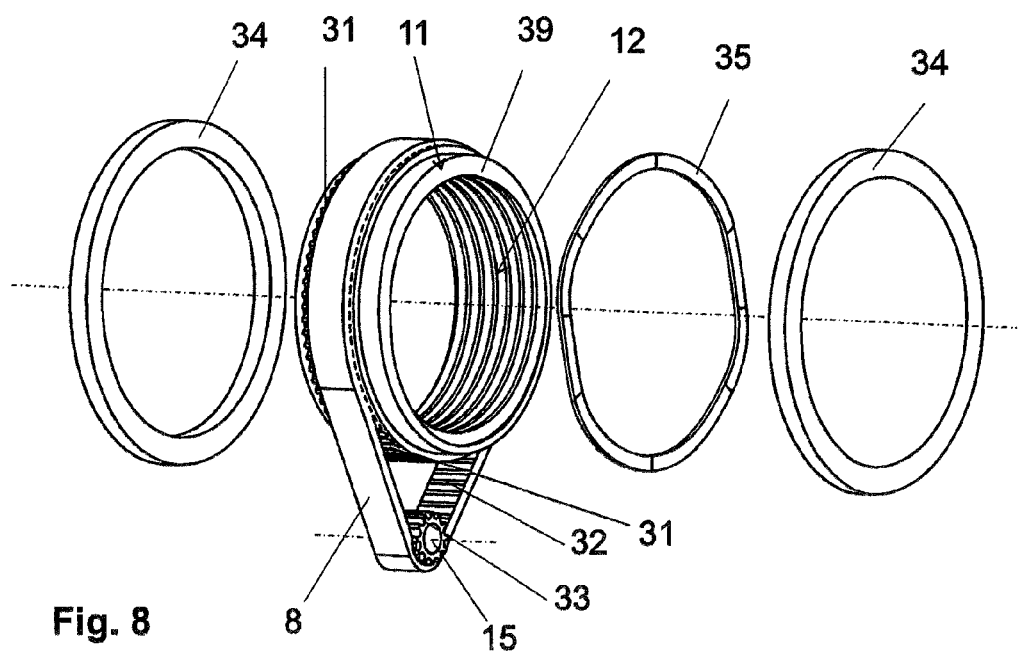

Major parts of the steering column 1 are not illustrated in FIG. 5, so as to give a clear view of the intermediate part 23, the motor 7 and the steering spindle bearing unit 2 or the part 17 thereof. In FIG. 6, the intermediate part 23 is then also omitted. FIGS. 7 and 8 show only the nut 11 with the drive belt 8 and the drive rotor 15 of the motor 7.

In the exemplary embodiment shown, the steering spindle bearing unit 2 or the part 17 thereof is led through the nut 11, wherein an internal thread 12 realized on the nut 11 engages into the external thread 6, implemented in the form of the thread sections 10, of the steering spindle bearing unit 2 or of the part 17 thereof. The nut 11 can be rotated by way of the drive belt 8. For this purpose, the motor 7, by way of its drive rotor 15, engages on or in the drive belt 8. In the exemplary embodiment shown, for interaction with the drive belt 8, the nut 11 bears an external toothing 31 into which the belt toothing 32 engages. In this exemplary embodiment, the drive rotor 15 also bears a corresponding external toothing 33 in order that it can likewise engage in positively locking fashion into the belt toothing 32. Alternatively, the rotational movement of the motor 7 or of its drive rotor 15 may be transmitted to the nut 11 in some other way. If provision is to be made of corresponding friction forces, it is for example also possible for the belt toothing 32 and the external toothings 31 and 33 to be omitted. The use of a drive chain as a replacement for the drive belt 8 is also possible. The use of a toothed belt is however preferable as it generates very little noise during operation and has only a low weight and, even with relatively low tolerance requirements, can transmit adequately high torques.

Other than in a crash situation, the nut 11 is not adjustable in terms of its position along the steering spindle longitudinal axis 3, that is to say along the longitudinal direction 36. In the exemplary embodiment shown, said nut is for this purpose rotatably mounted in a recess, which is correspondingly delimited in the longitudinal direction 36, in the intermediate part 23. This ensures that, as the nut 11 rotates, the part 17 of the steering spindle bearing unit 2 is displaced in the longitudinal direction 36, whereas the nut 11 is static as viewed in said direction.

The play setting means 28 illustrated in FIG. 5 serves for enabling the play of the steering spindle bearing unit 2 or of the part 17 thereof in the intermediate part 23 to be restricted to the required extent or correspondingly set.

In the exemplary embodiment shown, the nut 11 bears two guide rings 34, as an axial bearing, and a spring ring 35 which preloads at least one of the guide rings 34 against the main body 39 of the nut 11 in the direction of the steering spindle longitudinal axis 3. This serves for eliminating the play of the nut 11 in longitudinal directions 36 in the intermediate part 23. This form of play elimination may possibly be dispensed with or implemented in some other way. The guide rings 34 can perform not only the function of axial mounting but also the function of radial mounting. In this case, it is also conceivable and possible for the axial and/or radial mounting to be realized by way of rolling bearings, which may then also replace the guide rings.

LIST OF REFERENCE SIGNS

| 1  | Steering column |
| 2  | Steering spindle bearing unit |
| 3  | Steering spindle longitudinal axis |
| 4  | Steering spindle |
| 4a | Fork |
| 5  | Supporting unit |
| 6  | Thread |
| 7  | Motor |
| 8  | Drive belt |
| 9  | Circumferential direction |
| 10 | Threaded section |
| 11 | Nut |
| 12 | Internal thread |
| 13 | Carriage |
| 14 | Energy-absorbing element |
| 15 | Drive rotor |
| 16 | Steering wheel connection |
| 17 | Part |
| 18 | Part |
| 19 | Steering assistance means |
| 20 | Pivot axis |
| 21 | Fastening lug |
| 22 | Rocker |
| 23 | Intermediate part |
| 24 | Height adjustment spindle |
| 25 | Toothed belt |
| 26 | Height adjustment motor |
| 27 | Height adjustment nut |
| 28 | Play setting means |
| 29 | Guide peg |
| 30 | Guide groove |
| 31 | External toothing |
| 32 | Belt toothing |
| 33 | External toothing |
| 34 | Guide ring |
| 35 | Spring ring |
| 36 | Longitudinal direction |
| 37 | Height direction |
| 38 | Leadthrough |
| 39 | Main body |

The invention claimed is:

1. A steering column for a motor vehicle, comprising: a steering spindle bearing unit and a steering spindle, which is mounted in the steering spindle bearing unit so as to be rotatable about a steering spindle longitudinal axis, and a supporting unit which is provided for the fastening of the steering column in the motor vehicle and on which the steering spindle bearing unit is held, and the steering spindle bearing unit has a thread and can be adjusted along the steering spindle longitudinal axis relative to the supporting unit by way of a motor, characterized in that the steering spindle bearing unit, for its adjustment along the steering spindle longitudinal axis relative to the supporting unit, is connected by means of at least one drive belt or at least one drive chain to the motor, wherein a nut engages into the thread, and said nut can be rotated by means of the drive belt or the drive chain, wherein the nut has an internal thread and engages by way of said internal thread into the thread of the steering spindle bearing unit, and/or in that the steering spindle bearing unit is guided through the nut.

2. The steering column of claim 1, wherein the thread is an external thread formed on the outside of the steering spindle bearing unit.

3. The steering column of claim 1, wherein the thread is in the form of preferably strip-shaped thread sections which are spaced apart from one another in a circumferential direction of the steering spindle bearing unit.

4. The steering column of claim 1, wherein the thread is arranged fixedly and non-rotatably on the steering spindle bearing unit.

5. The steering column of claim 1, wherein the steering spindle bearing unit is mounted in the supporting unit, so as to be non-rotatable relative to the supporting unit, by way of a means for preventing rotation about the steering spindle longitudinal axis.

6. The steering column of claim 1, wherein the motor has a drive rotor by which it engages on the drive belt or on the drive chain.

7. The steering column of claim 1, wherein the steering spindle bearing unit is of multi-part form, wherein the parts of the steering spindle bearing unit are arranged so as to engage one inside the other in telescopic fashion in the direction of the steering spindle longitudinal axis, and that part of the steering spindle bearing unit which is situated closest to a steering wheel connection of the steering spindle has the thread.

8. A steering column for a motor vehicle, comprising: a steering spindle bearing unit and a steering spindle, which is mounted in the steering spindle bearing unit so as to be rotatable about a steering spindle longitudinal axis, and a supporting unit which is provided for the fastening of the steering column in the motor vehicle and on which the steering spindle bearing unit is held, and the steering spindle bearing unit has a thread and can be adjusted along the steering spindle longitudinal axis relative to the supporting unit by way of a motor, characterized in that the steering spindle bearing unit, for its adjustment along the steering spindle longitudinal axis relative to the supporting unit, is connected by means of at least one drive belt or at least one drive chain to the motor, wherein the steering spindle bearing unit is held on the supporting unit with the interposition of a carriage, wherein the carriage with the steering spindle bearing unit is mounted displaceably on the supporting unit with the interposition of an energy-absorbing element for a crash situation.

* * * * *